United States Patent
Onyekwelu

(10) Patent No.: US 11,095,762 B2
(45) Date of Patent: Aug. 17, 2021

(54) DISPLAY DEVICE WITH CAMERA EMBEDDED BENEATH SCREEN

(71) Applicant: International Business Machines Corporation, Armonk, NY (US)

(72) Inventor: Adaoha Onyekwelu, Wappingers Falls, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 37 days.

(21) Appl. No.: 16/168,209

(22) Filed: Oct. 23, 2018

(65) Prior Publication Data

US 2020/0128119 A1    Apr. 23, 2020

(51) Int. Cl.
*H04M 1/02* (2006.01)
*H04N 5/232* (2006.01)
*H04N 5/225* (2006.01)

(52) U.S. Cl.
CPC ........ *H04M 1/0264* (2013.01); *H04N 5/2252* (2013.01); *H04N 5/2254* (2013.01); *H04N 5/2257* (2013.01); *H04N 5/23293* (2013.01)

(58) Field of Classification Search
None
See application file for complete search history.

(56) References Cited

U.S. PATENT DOCUMENTS

| | | | |
|---|---|---|---|
| 9,645,663 B2* | 5/2017 | Mavrody | ............ G06F 3/04886 |
| 9,767,728 B2 | 9/2017 | Evans, V et al. | |
| 9,842,549 B2 | 12/2017 | Musgrave et al. | |
| 9,870,024 B2* | 1/2018 | Evans, V | ............. H04N 5/2258 |
| 9,998,642 B2 | 6/2018 | Evans, V et al. | |
| 10,070,030 B2* | 9/2018 | Evans, V | ............. H04N 5/2253 |
| 2013/0231157 A1 | 9/2013 | Chung | |
| 2014/0232958 A1* | 8/2014 | Venturas | ........... G02F 1/133308 349/12 |
| 2016/0219199 A1 | 7/2016 | Streuter et al. | |
| 2016/0234477 A1 | 8/2016 | Singhal | |
| 2017/0084231 A1* | 3/2017 | Chew | .................... G06F 1/1626 |
| 2017/0124942 A1* | 5/2017 | Evans, V | ........... G02B 27/0093 |
| 2017/0162111 A1* | 6/2017 | Kang | .................. H01L 27/3276 |

(Continued)

FOREIGN PATENT DOCUMENTS

GB    2552090 A    1/2008

OTHER PUBLICATIONS

Andersen et al.; "A Hand-Held, Self-Contained Simulated Transparent Display", ISARR-Adjunct IEEE International Symposium On, Sep. 19-23, 2016, pp. 96-101.

(Continued)

*Primary Examiner* — James M Hannett
(74) *Attorney, Agent, or Firm* — Cantor Colburn LLP; Teddi Maranzano

(57) ABSTRACT

A display is provided and includes a screen and an image or video capture device. The screen has a total surface area and an interactive area. The interactive area occupies a substantial entirety of the total surface area and is configured to display information and to be interacted with by a user. The image or video capture device is embedded beneath a section of the screen in a portion of the interactive area. The image or video capture device is configured to capture images and videos through the section of the screen.

12 Claims, 3 Drawing Sheets

(56) References Cited

U.S. PATENT DOCUMENTS

| | | |
|---|---|---|
| 2018/0123631 A1 | 5/2018 | Hessabi |
| 2018/0124293 A1* | 5/2018 | Cohen |
| 2018/0219987 A1* | 8/2018 | Pantel .................... G06F 3/041 |
| 2019/0033688 A1* | 1/2019 | Kakkar ................ G02B 6/003 |

OTHER PUBLICATIONS

Grubert et al.; "Towards Interaction Around Unmodified Camera-Equipped Mobile Devices", Cornell University Library, Jan. 14, 2017, pp. 1-7.
Morrison, D. Gerald; "A Camera-Based Input Device for Large Interactive Displays", IEEE Computer Graphics and Applications, vol. 25, Issue 4, Jul.-Aug. 2005, pp. 52-57.
Walker, Geoff; "Camera-Based Optical Touch Technology", Joural of Information Display, Mar. 2011, pp. 30-34.

* cited by examiner

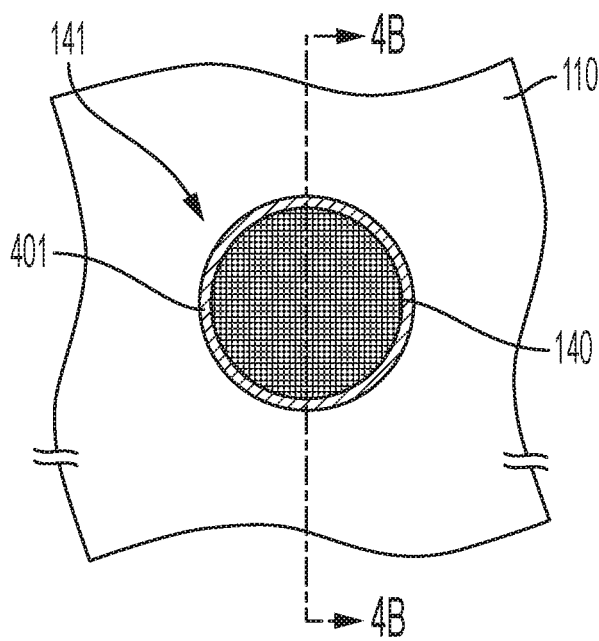
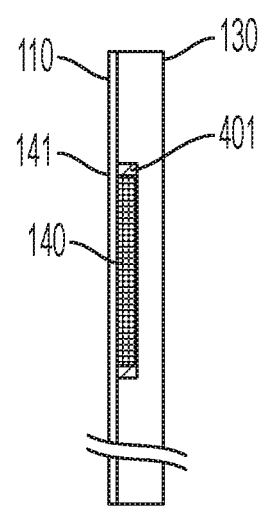
FIG. 4A  FIG. 4B
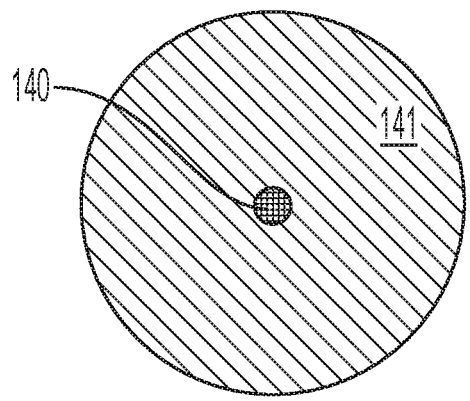
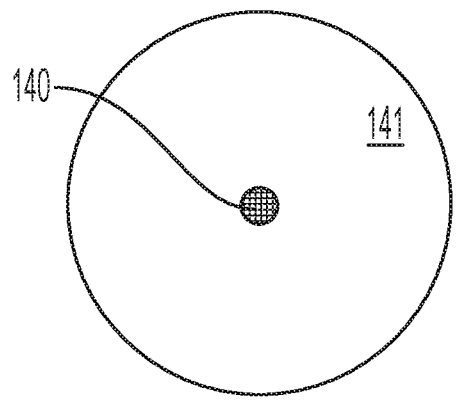
FIG. 5A  FIG. 5B

DISPLAY DEVICE WITH CAMERA EMBEDDED BENEATH SCREEN

BACKGROUND

The present invention generally relates to display devices and more specifically, to a display device with a camera embedded beneath a screen.

Display devices are often configured to be portable and can take the form of smartphones and tablets among others. For smartphones in particular, display devices typically include various electrical and computing devices that are housed in a housing and covered by a screen as well as a camera that can take pictures and video. The camera usually has two apertures, one on the back of the housing (the "back facing camera") and another on the front of the display device (the "front facing camera"). The screen is secured in a bezel of the housing and is usually configured with an active area and an inactive area. The active area is interactive with a user and can be used to display information to the user or to receive commands from the user. The inactive area is not generally interactive with the user and can be configured to secure a microphone, a light emitting diode (LED) for alerting the user to certain events and the front facing camera.

SUMMARY

Embodiments of the present invention are directed to a display. A non-limiting example of the display includes a screen and an image or video capture device. The screen has a total surface area and an interactive area. The interactive area occupies a substantial entirety of the total surface area and is configured to display information and to be interacted with by a user. The image or video capture device is embedded beneath a section of the screen in a portion of the interactive area. The image or video capture device is configured to capture images and videos through the section of the screen.

Embodiments of the present invention are directed to a display device. A non-limiting example of the display device includes a screen, internal display device elements, a housing and an image or video capture device. The screen has a total surface area and an interactive area. The interactive area is configured to display information and to be interacted with by a user. The internal display device elements are configured to display information on the interactive area and to be receptive of user commands inputted into the interactive area. The housing houses the internal display device elements and supports the screen such that the interactive area occupies a substantial entirety of the total surface area. The image or video capture device is embedded beneath a section of the screen in a portion of the interactive area. The image or video capture device is configured to capture images and videos through the section of the screen.

Embodiments of the invention are directed to a smartphone. A non-limiting example of the smartphone includes a screen, internal smartphone elements, a bezel-less housing, and an image or video capture device. The screen has a total surface area and an interactive area. The interactive area has menu bar and application regions that are each configured to display information and to be interacted with by a user. The internal smartphone elements are configured to display information on the interactive area and to be receptive of user commands inputted into the interactive area. The bezel-less housing houses the internal smartphone elements and supports the screen such that the interactive area occupies a substantial entirety of the total surface area. The image or video capture device is embedded beneath a section of the screen in a portion of the interactive area within the menu bar region. The image or video capture device is configured for operation by the internal smartphone elements to capture images and videos through the section of the screen.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4A is a front view of an image or video capture device embedded beneath a section of a screen of the display device of FIGS. 1-3 in accordance with embodiments of the present invention;

FIG. 4B is a side view of the image or video capture device taken along line 4B-4B of FIG. 4A;

FIG. 5A is a front view of an image or video capture device embedded beneath a section of a screen of the display device of FIGS. 1-3 that is formed of a material having variable tints in accordance with embodiments of the present invention; and FIG. 5B is a front view of an image or video capture device embedded beneath the section of the screen of the display device of FIGS. 1-3 of FIG. 5A.

Figures 1, 2:
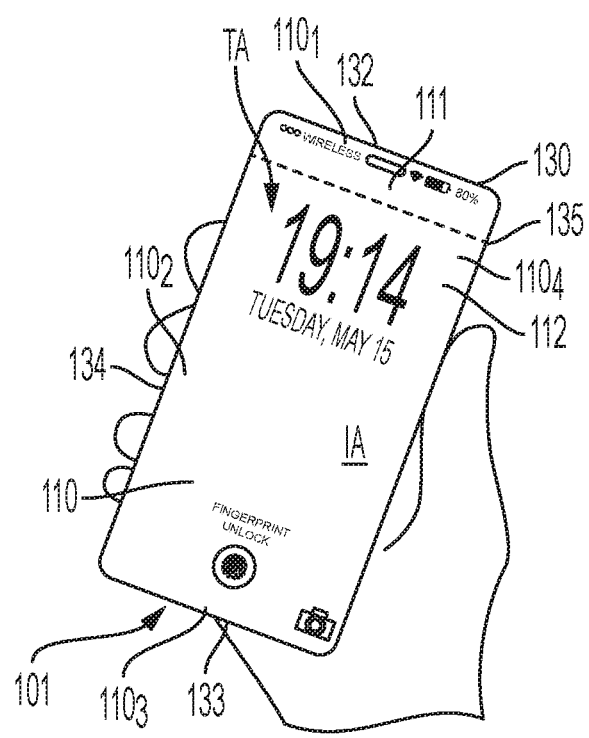
FIG. 1 is a front view of a display device configured as a smartphone in accordance with embodiments of the present invention.
FIG. 2 is a back view of the display device of FIG. 1.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, while advances are being made with mobile devices and new designs that shave down bezels around handheld devices are being attempted, manufacturers are still limited to hiding the front facing cameras in regions that are not screened. For a smartphone, this region is typically at or near the top edge of the smartphone and tends to wear out or jam. This can lead to degraded performance of the front facing camera. Manufacturers are also carving out particular notches around the front facing camera, which results in a screen size that is markedly reduced and irregularly shaped.

Turning now to an overview of the aspects of the invention, one or more embodiments of the invention address the above-described shortcomings of the prior art by placement of a front facing camera of any handheld device behind the device's screen and making use of two-way "mirror" technology or any related technology therefor. When a user enables the front facing camera, this triggers the technology behind the screen allowing the camera to see through the screen and take a picture as a user normally would.

The above-described aspects of the invention address the shortcomings of the prior art by providing a display or a display device that includes a screen and an image or video capture device. The screen has a total surface area and an interactive area. The interactive area occupies a substantial entirety of the total surface area and is configured to display information and to be interacted with by a user. The image or video capture device is embedded beneath a section of the screen in a portion of the interactive area. The image or video capture device is configured to capture images and videos through the section of the screen.

Turning now to a more detailed description of aspects of the present invention, FIGS. 1 and 2 depict a display device 101. The display device 101 can be configured as one or more of a smart reflective surface (i.e., a mirror or a projection screen that can be interacted with by a user), an audio or video playback device, a smartphone, a tablet or any other portable computing device. It is to be understood that, while FIGS. 1 and 2, FIGS. 3, 4A and 4B and the following text relate to the case of the display device 101 being configured as a smartphone, this is done for clarity and brevity and is not intended to otherwise limit the scope of the present application as a whole.

Figure 3:
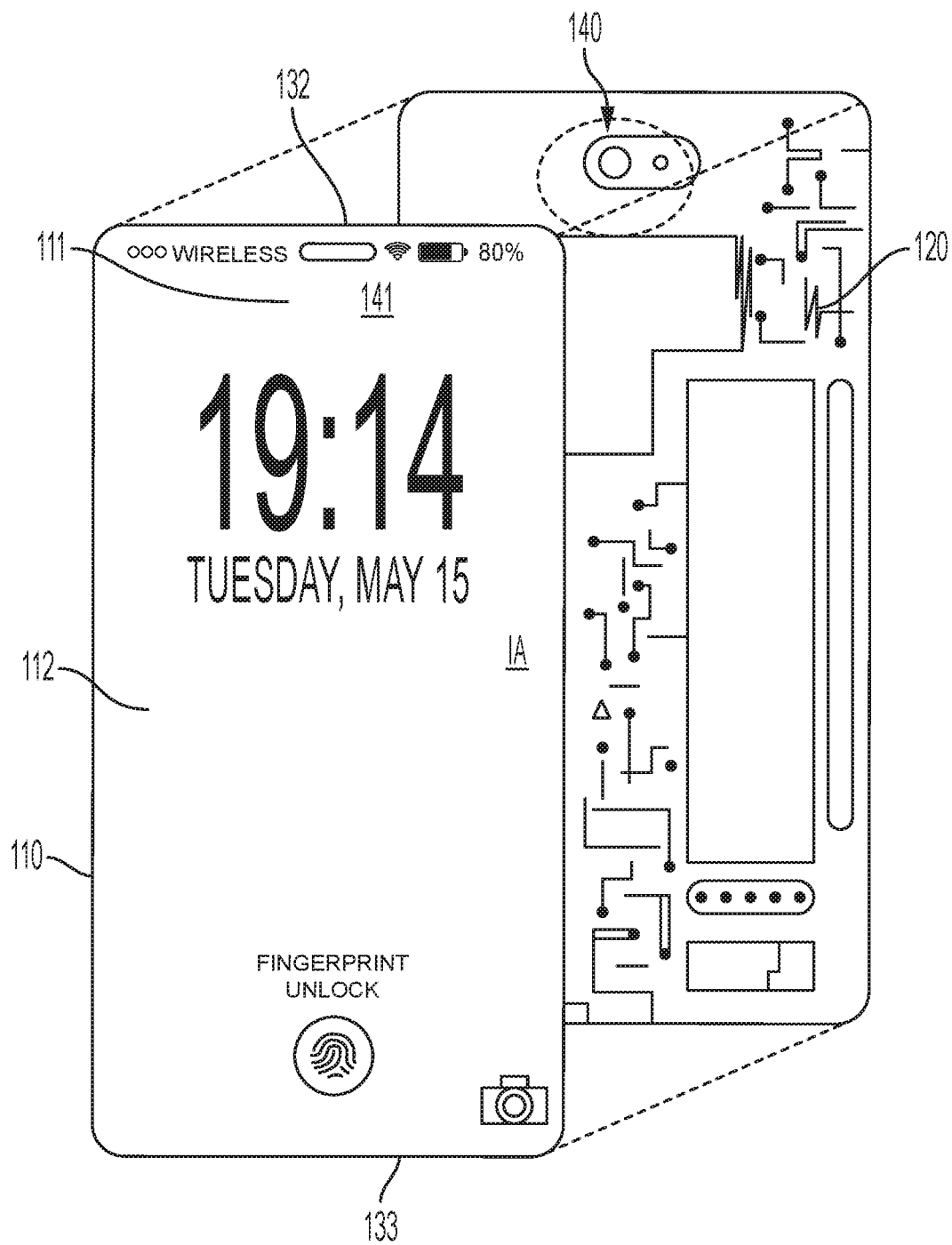
FIG. 3 is a front view of internal display device elements of the display device of FIGS. 1 and 2 in accordance with embodiments of the present invention.

With continued reference to FIGS. 1 and 2 and with additional reference to FIG. 3, the display device 101 includes a screen 110, internal display device elements 120 (see FIG. 3), a housing 130 and an image or video capture device 140 (see FIG. 3) that is embedded beneath the screen 110.

The screen 110 can be formed of a liquid crystal or other similar materials and can be entirely flat, flat with curved sides or curved overall. In any case, the screen 110 has a total surface area TA and an interactive area IA. The interactive area IA is configured to display information and to be interacted with by a user and can include a menu bar region 111, in which certain information is generally displayed as a default condition, and an application region 112, in which applications are listed and executed.

Although the menu bar region 111 and the application region 112 of the interactive area IA are illustrated in FIGS. 1 and 3 as being located at a long end of the screen 110 and in the remainder of the screen 110, it is to be understood that this is not required and that the positioning of the menu bar region 111 and the application region 112 can be dependent upon an orientation of the display device 101 and/or a set preference of the user.

The internal display device elements 120 include various electronic, computing, memory and power components and are cooperatively configured to display information on the interactive area IA, to be receptive of user commands inputted into the interactive area IA and to control certain operations of the image or video capture device 140 as well as any other similar component.

The housing 130 can be provided, for example, as a bezel-less or nearly bezel-less housing and is configured to house the internal display device elements 120 and to support the screen 110. The housing 130 includes a rear facing surface 131 (see FIG. 2), first and second minor sides 132 and 133 that are opposite one another and first and second major sides 134 and 135 that are opposite one another. Corners of the housing 130 where the first major side 134 meets the first and second minor sides 132 and 133 and where the second major side 135 meets the first and second minor sides 132 and 133 can be angular or rounded.

For all configurations of the screen 110 and the housing 130, the screen 110 and the housing 130 are generally configured such that the interactive area IA of the screen 110 occupies a substantial entirety of the total surface area TA of the screen. That is, the interactive area IA of the screen 110 includes four portions $110_1$, $110_2$, $110_3$ and $110_4$ with the first portion $110_1$ being immediately adjacent to the first minor side 132, the second portion $110_2$ being immediately adjacent to the first major side 134, the third portion $110_3$ being immediately adjacent to the second minor side 133 and the fourth portion $110_4$ being immediately adjacent to the second major side 135.

As shown in FIG. 3, the image or video capture device 140 is embedded in the display device 101 beneath a section 141 of the screen 110 in a portion of the interactive area IA, which can be but is not required to be within the menu bar region 111 (i.e., when the display device 101 is held right-side or long-side up and the menu bar region 111 is provided at the uppermost short side) and which can be but is not required to be proximate to either of the first and second minor sides 132 and 133. The image or video capture device 140 can refer to an overall or all-encompassing image or video capture device that includes or is provided as a camera with a light emitting feature for generating a flash. In any case, the image or video capture device 140 is configured to be operated at least partially by the internal display device elements 120 to capture images and videos through the section 141 of the screen 110.

In accordance with embodiments, with the image or video capture device 140 embedded in the display device 101 beneath the section 141 of the screen 110 in the portion of the interactive area IA, the section 141 of the screen 110 can have a varying and, in some cases, adjustable tint. In any case, however, the section 141 of the screen 110 can be at least somewhat translucent regardless of an amount of tint in effect at any one time. Thus, the image or video capture device 140 can capture images and videos through the section 141 of the screen 110 regardless of the amount of tint in effect during the image or video capture event and with or without the benefit of the flash provided by the light emitting feature.

In accordance with embodiments and as shown in FIG. 2, the display device 101 can also include an additional image or video capture device 150 embedded in the rear facing surface 131 of the housing 130. The additional image or video capture device 150 can include or be provided as a camera and is configured to be operated at least partially by the internal display device elements 120 to capture images and videos.

With continued reference to FIG. 3 and with additional reference to FIGS. 4A and 4B, the section 141 of the screen 110 can include a two-way reflective screen material. In such cases, as shown in FIGS. 4A and 4B, the internal display device elements 120 (see FIG. 3) can include a light emitting element 401 disposed proximate to the image or video capture device 140. Here, the light emitting element 401 is configured to be at least partially operated by the internal display device elements 120 to emit light (i.e., a flash) through the two-way reflective screen material of the section 141 of the screen 110 during an image or video capture event. In this way, the emitted light can be reflected off of a scene being image or video captured to a sufficient magnitude whereby the scene can be optically viewed by the image or video capture device 140 through the section 141 of the screen 110.

With continued reference to FIG. 3 and with additional reference to FIGS. 5A and 5B, an opacity of the section 141 of the screen 110 can be adjustable. That is, when the image or video capture device 140 is not presently in use, an opacity of the section 141 of the screen 110 can be set at a normal or default level. By contrast, during an image or video capture event, the opacity of the section 141 of the screen 110 can be reduced at least locally in order to permit the image or video capture device 140 to optically view a scene being image or video captured. The adjustments of the opacity of the section 141 of the screen 110 can be facilitated by forming the section 141 of the screen 110 with material which is capable of having variable tint in the presence of light or current and can be controlled by the internal display device elements 120 applying such light or current to the material of the section 141.

In accordance with embodiments, it is to be understood that the embodiments of FIGS. 4A and 4B and the embodiments of FIGS. 5A and 5B can be provided separately or combined together. In accordance with further embodiments, the section 141 of the screen 110 can be configured to display information and to be interacted with by the user when the image or video capture device 140 is not currently in operation. As such, a total usable or active area of the interactive area IA of the screen 110 need not be reduced to compensate for the presence of the image or video capture device 140.

In accordance with further embodiments, it is to be understood that a section 141 of the screen 110 including two-way reflective screen material in the embodiments of FIGS. 4A and 4B and in the embodiments of FIGS. 5A and 5B can be modified as needed to effectively act as a one-way reflective screen material in certain cases. For example, where the opacity of the screen material is variable as in the embodiments of FIGS. 5A and 5B, the opacity of the screen material can be increased to a maximum at which the section 141 of the screen 110 is effectively provided as a one-way reflective surface.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A display device, comprising:
  a screen having a total surface area and an interactive area, the interactive area being configured to display information and to be interacted with by a user, wherein the screen in the interactive area comprises an internal surface and an external surface opposite the internal surface;
  internal display device elements configured to display information on the interactive area and to be receptive of user commands inputted into the interactive area;
  a housing to house the internal display device elements and comprising a housing surface to support the screen such that the interactive area occupies a substantial entirety of the total surface area; and
  an image or video capture device embedded in a recess of the housing defined from a plane of the housing surface and beneath a section of the screen in a portion of the interactive area, the image or video capture device having a first surface abutting a first corresponding portion of the internal surface and being configured to capture images and videos through the section of the screen, wherein the internal display device elements comprise a light emitting element disposed annularly about and immediately adjacent to an outer edge of the image or video capture device, the light emitting element having a second surface coplanar with a plane of the first surface and the plane of the housing surface and abutting a second corresponding portion of the internal surface and being configured to emit light through the section of the screen during an image or video capture event.

2. The display device according to claim 1, wherein the display device is configured as one or more of a smart reflector, an audio or visual playback device, a smartphone and a tablet.

3. The display device according to claim 1, wherein the interactive area of the screen comprises a menu bar region and an application region.

4. The display device according to claim 3, wherein the portion of the interactive area is within the menu bar region.

5. The display device according to claim 1, wherein the housing is configured as a bezel-less housing.

6. The display device according to claim 1, wherein:
the housing comprises a rear facing surface and four sides, and the interactive area comprises four portions that are each immediately adjacent to a corresponding one of the four sides.

7. The display device according to claim 6, further comprising an additional image or video capture device embedded in the rear facing surface.

8. The display device according to claim 1, wherein the section of the screen through which the image or video capture device captures images and videos comprises a two-way screen material through which the light emitting element emits light.

9. The display device according to claim 1, wherein an opacity of the section of the screen is adjustable.

10. A smartphone, comprising:
a screen having a total surface area and an interactive area, the interactive area having menu bar and application regions that are each configured to display information and to be interacted with by a user, wherein the screen in the interactive area comprises an internal surface and an external surface opposite the internal surface;

internal smartphone elements configured to display information on the interactive area and to be receptive of user commands inputted into the interactive area;

a bezel-less housing to house the internal smartphone elements and comprising a housing surface to support the screen such that the interactive area occupies a substantial entirety of the total surface area; and an image or video capture device embedded in a recess of the bezel-less housing defined from a plane of the housing surface and beneath a section of the screen in a portion of the interactive area within the menu bar region, the image or video capture having a first surface abutting a first corresponding portion of the internal surface and device being configured for operation by the internal smartphone elements to capture images and videos through the section of the screen, wherein the internal smartphone elements comprise a light emitting element disposed annularly about and immediately adjacent to an outer edge of the image or video capture device, the light emitting element having a second surface coplanar with a plane of the first surface and the plane of the housing surface and abutting a second corresponding portion of the internal surface and being configured for operation by the internal smartphone elements to emit light through the section of the screen during an image or video capture event.

11. The smartphone according to claim 10, wherein the section of the screen through which the image or video capture device captures images and videos comprises a two-way screen material through which the light emitting element emits light.

12. The smartphone according to claim 10, wherein an opacity of the section of the screen is adjustable.

* * * * *